(12) United States Patent
Xu et al.

(10) Patent No.: US 7,880,745 B2
(45) Date of Patent: Feb. 1, 2011

(54) SYSTEMS AND METHODS FOR BORDER COLOR HANDLING IN A GRAPHICS PROCESSING UNIT

(75) Inventors: Jim Xu, San Jose, CA (US); Mike Hong, Cupertino, CA (US); John Brothers, Calistoga, CA (US)

(73) Assignee: Via Technologies, Inc., Taipei (TW)

( * ) Notice: Subject to any disclaimer, the term of this patent is extended or adjusted under 35 U.S.C. 154(b) by 928 days.

(21) Appl. No.: 11/740,415

(22) Filed: Apr. 26, 2007

(65) Prior Publication Data

US 2007/0291044 A1    Dec. 20, 2007

Related U.S. Application Data

(60) Provisional application No. 60/815,053, filed on Jun. 20, 2006.

(51) Int. Cl.
G09G 5/00 (2006.01)
G09G 5/02 (2006.01)
G06T 15/50 (2006.01)

(52) U.S. Cl. .................. 345/582; 345/426; 345/587; 345/589

(58) Field of Classification Search ............. 345/582, 345/552, 426, 587, 505, 589, 591, 593
See application file for complete search history.

(56) References Cited

U.S. PATENT DOCUMENTS

| 5,765,182 A | 6/1998 | Lau et al. |
| 6,204,863 B1 | 3/2001 | Wilde |
| 6,266,733 B1 | 7/2001 | Knittel et al. |
| 6,288,730 B1 | 9/2001 | Duluk, Jr. et al. |
| 6,650,333 B1 * | 11/2003 | Baldwin .................. 345/552 |
| 6,825,848 B1 | 11/2004 | Fu et al. |
| 7,050,063 B1 | 5/2006 | Mantor et al. |

* cited by examiner

*Primary Examiner*—Hau H Nguyen
(74) *Attorney, Agent, or Firm*—Thomas, Kayden, Horstemeyer & Risley, LLP

(57) ABSTRACT

Systems and methods for border color handling in a graphics processing unit are disclosed. In one embodiment, the system includes a border color register that stores at least one border color pointer. A border color pointer indicates an address in an external memory at which border color information is located. Border color information is populated within external memory and retrieved by the texture cache controller if the texture filter unit requires a border color for texture mapping operations.

17 Claims, 5 Drawing Sheets

SYSTEMS AND METHODS FOR BORDER COLOR HANDLING IN A GRAPHICS PROCESSING UNIT

CROSS-REFERENCE TO RELATED APPLICATION

This application claims priority to U.S. provisional application having Ser. No. 60/815,053, filed Jun. 20, 2006, which is entirely incorporated herein by reference.

FIELD OF THE INVENTION

The present invention generally relates to graphics hardware, and, more specifically, to systems and methods for border color handling in a graphics processing unit.

BACKGROUND

As is known, computer graphics processing systems process large amounts of data, including texture data, among others. A texture is a digital image, often rectangular, having a (u, v) coordinate space. The smallest addressable unit of a texture is a texel, which is assigned a specific (u, v) coordinate based on its location. In a texture mapping operation, a texture is mapped to the surface of a graphical model as the model is rendered to create a destination image. In the destination image, pixels are located at specific coordinates in the (x, y) coordinate system.

Texture data often resides in system memory, which is a shared resource. In many computer systems, other devices may attempt to access data used by the graphics processing system or utilize a shared system bus, both of which may result in increased data access time for the graphics processing system. Additionally, requests for data from system memory may take excessive amounts of time for other reasons. Accordingly, accessing system memory may have a performance inhibiting effect on graphics processing systems.

One technique for improving data accessibility is through a texture cache that is dedicated to storing texture data. The texture cache is provided texture data from the system memory before the data is required for texture processing, thereby providing the graphics system with the texture data and reducing the requirement to access system memory. This, in turn, reduces problems associated with memory latency.

However, another type of data often required for texture processing, specifically border color data, can be stored and accessed in graphics systems quite differently from the above noted texture data with the texture cache systems. Border color data is often required during texture processing during texture processing occurring in a border color mode when a texel is requested that is out of boundary. When a texture is processed, or mapped to the surface of a graphical model, the texture may not sufficiently cover a graphical model, and texture processing systems within graphics processing units must handle the mapping of texture to a graphical model at coordinates out of range of the texture with a particular (u, v) dimension. Often, a border color is required in these situations because, as is known, a particular border color may be applied to a graphical model at coordinates out of boundary of the texture itself.

An alternative example of texture processing is the application of a texture to a graphical model in a "clamp" mode. If a texture image does not span the entire model in such a mode, the texture image can be "clamped" to cause the entire polygon to be covered. As should be appreciated by a person of ordinary skill in the art, effectively, the last pixel of a texture image extends to cover the remaining surface area of the model mapped with the texture image. Or, in other words, pixels out of range of the texture image are applied with the same texture data as the edge of the texture image. A clamp operation is a known operation to a person of ordinary skill as a texture processing operation on the above mentioned out of boundary coordinates.

The application of a texture to a graphical model in a "border color" mode is an alternative example of texture processing operations. If a texture image does not span the entire model in such a mode, a border color can be applied to coordinates of the graphical model outside the range of a texture image. This is in contrast to the above "clamp" example where the texture is effectively extended over an entire graphical model for portions of the model out of range of a chosen texture image. In a "border color" mode, a constant border color may be chosen for these out of range coordinates. A border color may be chosen by a programmer, an automated software algorithm, or by hardware performing texture processing operations and mapped to the graphical model at coordinates out of range of the chosen texture image. It should be appreciated that there are various other such modes for texture mapping operations, including, but not limited to: a "wrap" mode, a "middle" mode, and other modes that are known in the art.

Presently, border color information for texture processing operations in "border color" mode is generally stored in a dedicated memory or cache structure located within a graphics processing unit. Such border color information is typically represented by at least sixteen border colors for each shader that is executable by a graphics processing unit. Or, in other words, for each shader that is executable in parallel in a graphics processing unit, it is generally required that at least sixteen border colors be accessible. In addition, each of the sixteen border colors can be stored in various formats for use by a texture filtering unit or filtering process. As a non-limiting example, some graphics processing units store each border color in up to twelve different formats in a border color cache or border color memory. Further, each format may require at least 128 bits of cache or memory space for storage.

As is known, texture data is a shared resource that may be required by various stages of a graphics pipeline. In addition, multiple contexts of texture data may be required by parallel executing shaders within graphics processing unit. Various stages of a graphics pipeline may perform texture processing operations and require texture data or border color information. Therefore, an on-chip cache may be employed for the caching of texture data. As the performance of computer systems and particularly graphics processing increases, chip resources, including space on a graphics processing unit or graphics processing card becomes even more of a premium. Consequently, if a graphics processing unit is capable of executing several parallel shaders, a substantial amount of cache or memory dedicated to border color storage in addition to texture data may be necessary for a graphics processing unit utilizing dedicated border color cache or memory.

Therefore, it is desired to improve processing, design, and manufacturing efficiency of graphics processing units wherever possible. As the complexity and processing capability of graphics processing units increases, the use of dedicated border color caches or memory typically employed require a considerable number of gates, communication lines and hardware cost. Therefore, a heretofore unaddressed need exist to overcome these deficiencies of the prior art.

SUMMARY OF THE INVENTION

An embodiment of the present invention may be described as a graphics processing unit. The graphics processing unit may include a border color register, a texture cache, a texture cache controller, and a texture filter unit. The border color register stores at least one border color pointer, and the at least one border color pointer indicates an address in an external memory at which at least sixteen border colors are located. The texture cache controller is configured to present the at least sixteen border colors in a texel record format to the texture filter unit for border color operations. The texture cache controller is configured to store border colors fetched from the external memory in the texture cache;

The texture cache controller is also configured to fetch a border color on behalf of the texture filter unit from the external memory from a location in the external memory derived from a base address specified by a pointer stored within the border color register. The at least sixteen border colors are populated within the external memory and retrieved by the texture cache controller if the texture filter unit requires a border color for texture mapping operations. The at least sixteen border colors are stored in a plurality formats aligned in the external memory at 128 bit intervals.

Another embodiment may be described as method of processing border color information. The method includes populating an external memory with a plurality of border colors, and populating a border color register with the location in external memory of the plurality of border colors. The method also includes retrieving a single record of the plurality of border color records from the external memory, and storing the single record in a texture cache in a texel record format. The method may further include providing the texel record formatted single record to a texture filter for texture mapping operations requiring border color information.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
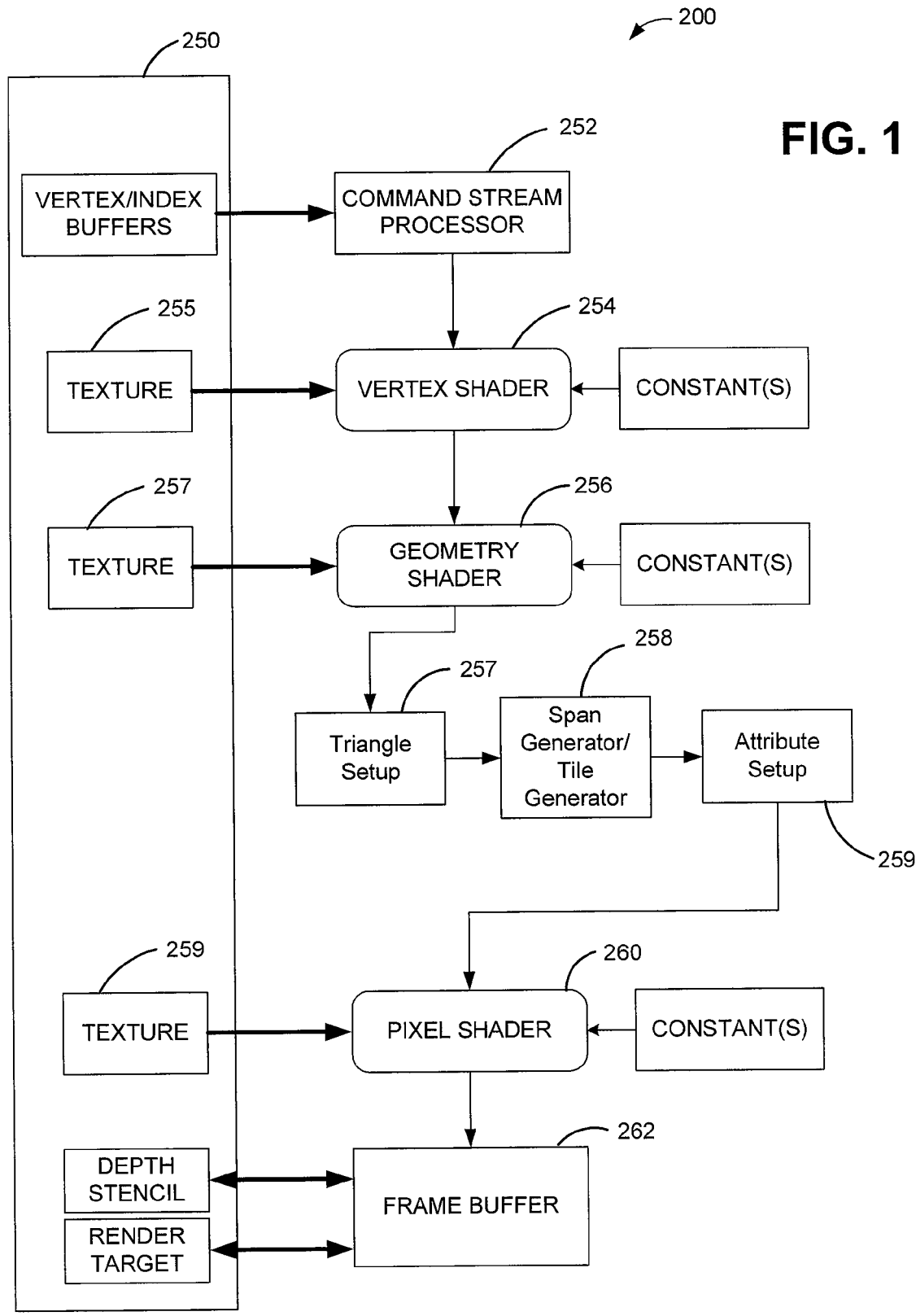
FIG. 1 depicts a block diagram illustrating components of a graphics pipeline.

Reference is now made in detail to the description of the embodiments as illustrated in the drawings, which may not be to scale. While several embodiments are described in connection with these drawings, there is no intent to limit the disclosure to the embodiment or embodiments disclosed herein. On the contrary, the intent is to cover all alternatives, modifications, and equivalents.

As summarized above, the present invention is directed to a novel system and method border color data handling. Before discussing implementation details of various embodiments, reference is made to FIG. 1, which is a block diagram illustrating certain components in a graphics pipeline, which may be utilized by or in embodiments of the present invention. As noted above, various stages of a graphics pipeline may perform texture operations which, in turn, may require access to border color information. Accordingly, the present invention provides for the storage and retrieval of border color data while improving gate count efficiency of a graphics processing unit.

Reference is now made to FIG. 1 which is a block diagram illustrating certain components or stages of a graphics pipeline 200. The first component is designated as a command stream processor 252, which essentially receives or reads vertices out of memory, which are used to form geometry primitives and create working items for the pipeline. In this regard, the command stream processor 252 reads data from memory and from that data generates triangles, lines, points, or other primitives to be introduced into the pipeline. This geometry information, once assembled, is passed to the vertex shader 254. The vertex shader 254, as is known, processes vertices, by performing operations such as transformations, scanning, and lighting. The vertex shader 254 may require access to texture operations or a texture engine in a graphics processing unit 250 from texture component 255. As noted above, if texture operations occur in a "border color" mode, then access to border color information may also be required. The vertex shader 254 passes data to the geometry shader 256. The geometry shader 256 receives, as inputs, vertices for a full primitive, and is capable of outputting multiple vertices that form a single topology, such as a triangle strip, a line strip, point list, etc. The geometry shader 256 may be further configured to perform the various algorithms, such as tessellation, shadow volume generation, etc. Similar to the above noted vertex shader 254, the geometry shader 256 may require access to texture operations or a texture engine in a graphics processing unit 250 from texture component 257. Accordingly, border color information may be required by this stage of the graphics pipeline 200.

The geometry shader 256 outputs information to a triangle setup stage 257, which, as is known in the art, performs operations such as triangle trivial rejection, determinant calculation, culling, pre-attribute setup KLMN, edge function calculation and guardband clipping. The operations necessary for a triangle setup phase should be appreciated by one of ordinary skill in the art and need not be elaborated further. The triangle setup stage 257 outputs information to the span generator/tile generator. This stage of the graphics pipeline is known in the art, and need not be discussed in further detail.

If a triangle processed by the triangle setup stage 257 is not rejected by the span generator/tile generator 258 or other stage of the graphics pipeline, then the attribute setup stage 259 of the graphics pipeline will perform attribute setup operations. The attribute setup stage generates the list of interpolation variables of known and required attributes to be determined in the subsequent stages of the pipeline. Further, the attribute setup stage 259, as is known in the art, processes various attributes related to a geometry primitive being processed by the graphics pipeline.

The pixel shader 260, is invoked for each pixel covered by the primitive that is output by the attribute setup stage 259. As is known, the pixel shader 260 operates to perform interpolations and other operations that collectively determine pixel colors for output to a frame buffer 262. Similar to the above noted vertex shader 254 and geometry shader 256, the pixel shader 260 may require access to texture operations or a texture engine in a graphics processing unit 250 from texture component 259. Accordingly, border color information may be required by this stage of the graphics pipeline 200. The operation of the various components illustrated in FIG. 1 are well known to persons skilled in the art, and need not be further described herein. Therefore, the specific implementation and operation internal to these units need not be described herein to gain and appreciate a full understanding of the present invention.

The above described graphics pipeline is typically implemented within a graphics processing unit or graphics processing apparatus. Current graphics pipelines are typically guided by published application programming interfaces (API) or a collection of API's that impose certain requirements on the manufacturers of graphics processing units. A non-limiting example of such an API is the Direct3D® API.

Figure 2:
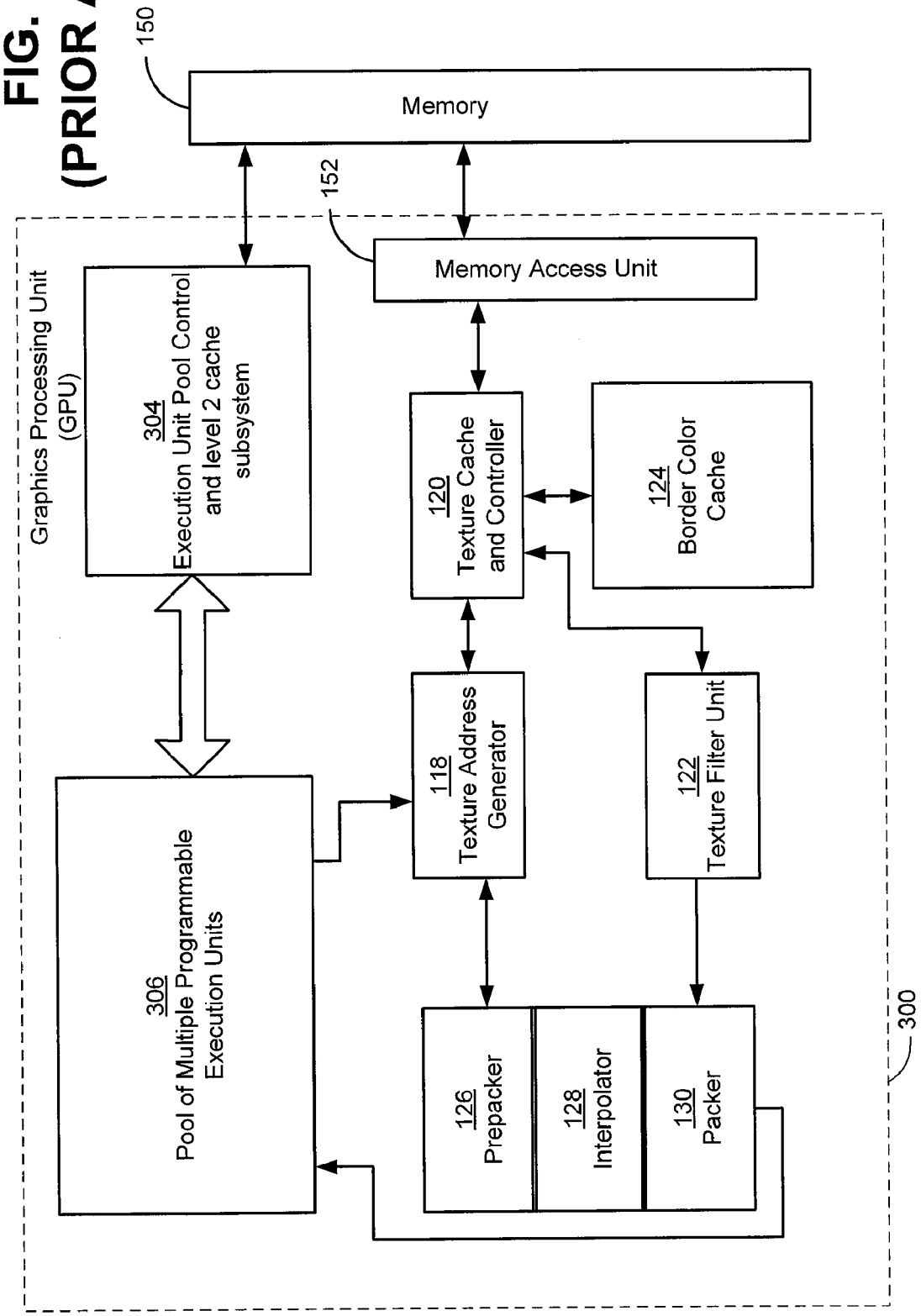
FIG. 2 depicts a functional block diagram illustrating a graphics processing unit and certain internal components of a graphics processing unit.

Reference is now made to FIG. 2, which depicts a conventional graphics processing unit incorporating a texture cache and controller 120 that is configured for storing border color data for retrieval for texture operations in a border color mode. It should be appreciated that some components not essential for description of the claimed invention of a graphics processing unit are omitted for ease of depiction. A computer graphics system including such a graphics processing unit includes an ability for a graphics programmer to create a programmable shader, such as a geometry shader, pixel shader, vertex shader, or others known in the art. Such shaders are created by a programmer and may be executed by at least one of a pool of multiple programmable execution units 306. It should be appreciated that the pool of execution units 306 can include a processing core capable of multithreaded operation. It should also be appreciated that such a graphics processing unit includes a capability of parallel execution of multiple shaders created by a graphics programmer. For example, a pixel shader may be executed in parallel with a geometry shader and another separate instance of a pixel shader. It should be appreciated that such parallel execution of shaders may require that the execution unit pool 306 have access to multiple contexts of texture data and/or border color data.

Prepacker 126 receives data from portions of a graphics pipeline not depicted, however, it should be appreciated by those of ordinary skill in the art that the prepacker 126 processes certain pixel operations during the execution of a graphics pipeline. Prepacker 126 is coupled to interpolator 128, which is component of the execution data path of a graphics pipeline in the depicted graphics processing unit. The texture address generator 118 issues a texture descriptor request in response to communication with a shader executing in the execution unit pool 306. The request is issued to the texture cache and texture cache controller (TCC) 120. The TCC 120 outputs the texture descriptor data to the texture address generator 118 or to the texture filter unit 122 for processing. Since the various examples of the texture address generator 118 are known in the art, further discussion of those components is omitted here.

Texture cache and texture cache controller 120 includes a texture cache for caching of texture data, such as texels, as well as a cache controller that handles requests for texture data. The TCC 120 retrieves requested texture data from memory 150 and caches texture data in the texture cache. The TCC 120 provides texture data, including texels, to the texture filter unit 122 for texture processing operations. The TCC 120 provides data such as a texel record to the texture filter unit 122 in a texel record format. The TCC 120 accesses texture data from memory 150 via the memory access unit 152 if requested data is not stored within the cache structure. The TCC 120 also fetches border color information stored in the border color cache 124 and presents the border color information to the texture filter unit 122 if the texture filter unit 122 requires such data for texture operations. Texture filter unit 122 further includes logic to decode a border color retrieved by the texture filter unit 122, as border colors are stored within the border color cache 124 in a border color format. Further, texture filter unit 122 must convert a retrieved border to an appropriate format for texture operations. As is known, border color information includes predefined constants representing colors for texture operations in border color mode. For example, a border color can be represented in 128-bit RGBA format and stored in the border color cache 124 so the texture filter unit 122 may apply the border color to a 2D or 3D model at coordinates on the model that are out of range of the (u,v) coordinates for a chosen texture image.

As is known, border color information may be required for multiple shaders executing in the execution unit pool 306 in parallel. Therefore, the border color cache 124 must have sufficient storage capability for border color information for each shader that is executable in parallel in the execution unit pool 306. Further, it is also known that for each shader that is executable in a graphics processing unit, there may be multiple border colors that are required for texture operations in border color mode, as the texture filter unit 122 may apply several border colors to a graphical model in border color mode. It is also known that any given border color may be required in multiple data formats depending on the type of border color texture operations performed by the texture filter unit 122. For example, a graphics processing unit architecture may support up to sixteen samples (i.e. sixteen border colors), so a single shader may require sixteen border colors stored in the border color cache 124 and must store various formats of each of the sixteen border colors. Additionally, graphics processing units may support multiple memory contexts for each shader that is executable in parallel, which necessitates maintaining multiple contexts of border colors in the border color cache 124. Therefore, a border color cache 124 may require sufficient storage capacity for multiple contexts of multiple border colors where each border color is stored in multiple formats.

Accordingly, storing border color information in an on-chip border color cache may require a rather large border color cache 124 as the performance of graphics processing units and computer systems progresses. As a non-limiting example, a graphics processing unit may be capable of executing a specified number of parallel shaders with current technology; however, future technology may increase this capability a great deal, potentially requiring more chip resources for border color storage. Furthermore, as is known, border color information is typically populated by a software driver in accordance with a software graphics API such as the Direct3D® API. Accordingly, hardware provisions for accessing and writing to the border color cache 124 by a software driver must be made in order to accommodate texture operations in a border color mode.

Figure 3:
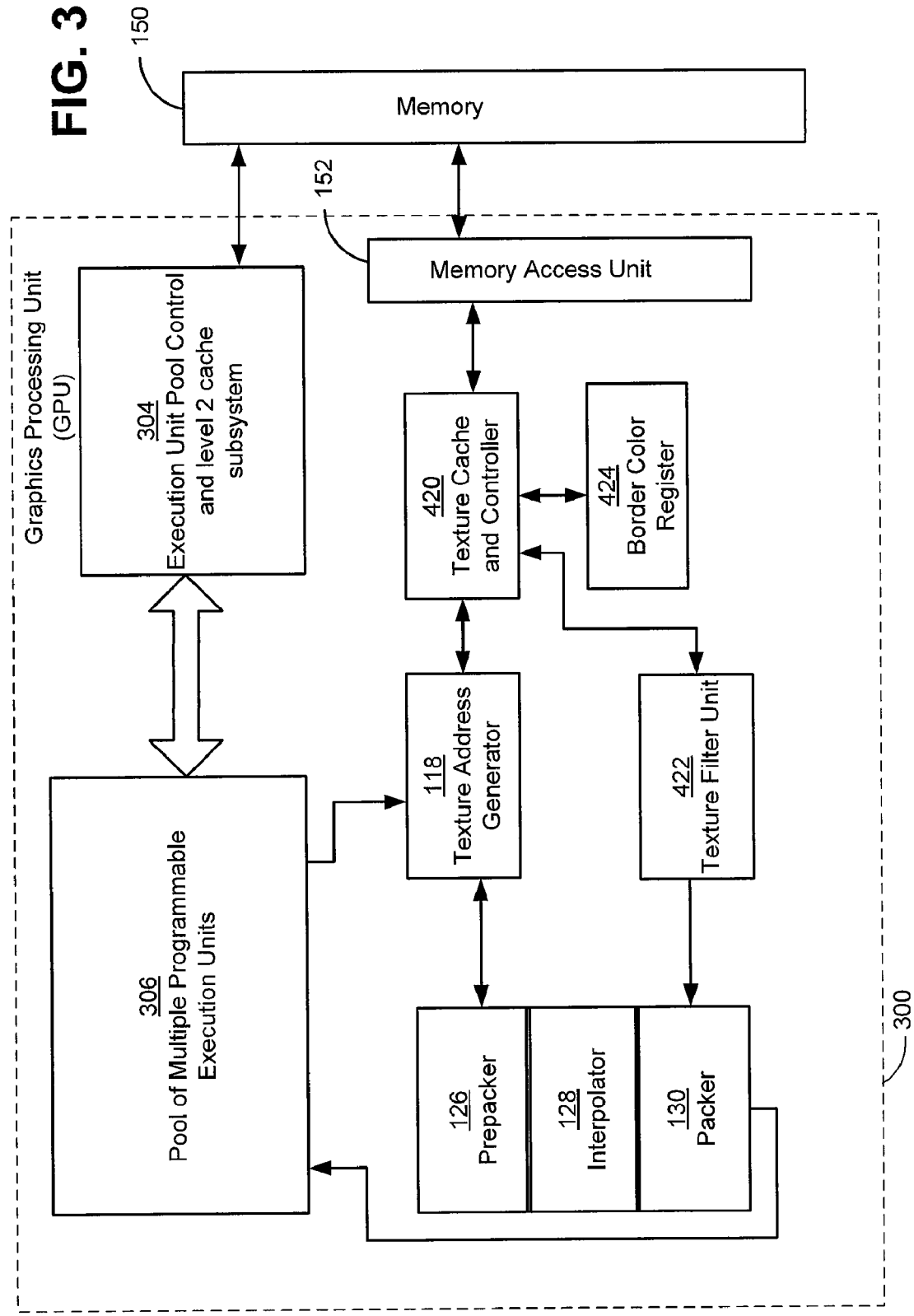
FIG. 3 depicts a functional block diagram of an execution unit of a graphics processing unit in accordance with an embodiment of the disclosure.

Reference is now made to FIG. 3, which depicts a graphics processing unit 300 in accordance with the present invention. It should be appreciated that some components not essential for description of the claimed invention of a graphics processing unit are omitted for ease of depiction. As noted above in reference to the graphics processing unit of FIG. 2, a computer graphics system including such a graphics processing unit of FIG. 3 includes an ability for a graphics programmer to create a programmable shader, such as a geometry shader, pixel shader, vertex shader, or others known in the art. Such shaders are created by a programmer and may be executed by at least one of a pool of multiple programmable execution units 306. It should be appreciated that the pool of execution units 306 can include a processing core capable of multi-threaded operation. It should also be appreciated that such a graphics processing unit includes a capability of parallel execution of multiple shaders created by a graphics programmer. As in the graphics processing unit of FIG. 2, it should also be appreciated that such parallel execution of shaders may require that the execution unit pool 306 has access to multiple contexts of texture data and/or border color data.

The texture address generator 118 issues a texture descriptor request in response to communication with a shader executing in the execution unit pool 206. The request is issued to the texture cache and texture cache controller (TCC) 420. The TCC 420 outputs the texture descriptor data to the texture address generator 118 or to the texture filter unit 422 for processing. Since the various examples of the texture address generator 310 are known in the art, further discussion of those components is again omitted here.

As noted above, texture cache and controller (TCC) 420 includes a texture cache for caching of texture data, such as texels, as well as a cache controller that handles requests for texture data. The TCC 420 retrieves requested texture data from memory and caches texture data in the texture cache. The TCC 420 provides texture data, including texels, to the texture filter unit 422 for texture processing operations. The TCC 420 provides data such as a texel record to the texture filter unit 422 in a texel record format. The TCC 420 accesses texture data from memory 150 via the memory access unit 152 if requested data is not stored within the cache structure.

If texture filter unit 422 requires border colors for texture operations, a graphics processing unit 300 of the present invention includes efficient border color handling systems to improve hardware gate count efficiency. Border color information can be stored in external memory 150 rather than in a dedicated cache as in the graphics processing unit depicted in FIG. 2. Border color register 424 can be populated with pointers to the location in the external memory 150 of the border color information. Pointers populated in the border color register 424 can specify a base address at which border color information is stored in the memory 150. As noted above, it is known that for each shader that is executable in a graphics processing unit, there may be multiple border colors that are required for texture operations in border color mode, as the texture filter unit 422 may apply several border colors to a graphical model in border color mode. It is also known that any given border color may be required in multiple data formats depending on the type of border color texture operations performed by the texture filter unit 422. For example, a graphics processing unit architecture may support up to sixteen samples (i.e. sixteen border colors); so a single shader may require sixteen border colors as well as various data formats of each of the sixteen border colors. Additionally, graphics processing units may support multiple memory contexts for each shader that is executable in parallel, which necessitates maintaining multiple contexts of border colors for each executable shader.

Accordingly, such border color information can be populated in the external memory 150 if texture operations are in a border color mode requiring such border colors. As a non-limiting example, a graphics processing unit capable of simultaneously executing a vertex shader, a geometry shader, and a pixel shader while also supporting two memory contexts for each shader can support the simultaneous storage, retrieval and caching in the TCC 420 of six border color contexts in external memory 150. Further, border colors can be populated in the external memory 150 in multiple data formats by a software driver, removing the need for TCC 420 or the texture filter unit 422 to convert a border color into an appropriate data format for texture operations. In addition, the TCC 420 may cache a retrieved border color in a data structure similar or identical to the structure used for caching retrieved texel records.

Alternatively, the TCC 420 may cache raw border color data and present border color data to the texture filter unit 422 in a texel record format. Caching retrieved border color data and/or presenting the border color data to the texture filter unit 422 in texel record format can simplify texture filter unit 422 and TCC 420 hardware logic by removing or reducing the need for the two components to deal with a specialized border color record. Alternatively, the texture filter unit 422 and TCC 420 may manipulate a border color in the same data structure as a texel record. Similarly, the need for a large border color cache integrated into the graphics processing unit is likewise removed because border color information is stored in and retrieved from external memory 150 rather than a separate border color cache.

Preferably, a given context of border color information is populated in external memory in a contiguous block of memory, where each border color record is stored in 128 bit intervals, as a non-limiting example, in the contiguous memory block. Preferably, each border color is converted to various supported data formats and likewise stored in the contiguous memory block. Accordingly, TCC 420 may retrieve a given border color from the contiguous block with the aid of a border color pointer stored in the border color register 424 specifying a base address in memory of the contiguous block. If texture operations are in a border color mode, each border color may be populated in external memory various formats including but not limited to: UINT32, SINT32, UNORM8, UNORM10, UNORM16, UNORM24, SNORM8, SNORM10, SNORM16, SNORM24, FP16 and FP32. Technical details regarding these formats are known and will certainly be understood by persons skilled in the art. For example, each of these formats is defined by the following basic information:

UINT32: unsigned 32 bits integer
    SINT32: signed 32 bits integer
    UNORM8: 8 bits unsigned normalized integer
    UNORM10: 10 bits unsigned normalized integer
    UNORM16: 16 bits unsigned normalized integer
    UNORM24: 24 bits unsigned normalized integer
    SNORM8: 8 bits signed normalized integer
    SNORM10: 10 bits signed normalized integer
    SNORM16: 16 bits signed normalized integer
    SNORM24: 24 bits signed normalized integer
    FP16: 16 bits float point value
    FP32: 32 bits float point value As noted above, if each border color is stored in a contiguous memory block and within the contiguous block each border color is populated in various formats in a consistent order in the contiguous block, the TCC 420 can retrieve a given border color record from using only the base address specified by a border color pointer in the border color register 424.

As noted above, the disclosed graphics processing unit architecture provides considerable hardware gate count efficiency relative to the graphics processing unit of FIG. 2 because the need for a border cache is removed. Further, as the performance of computer systems and graphics processing units progresses, the disclosed architecture provides a scalable solution to border color handling, because as a graphics processing unit is provided with the capability to execute more shader instances in parallel or support more memory contexts per shader, increased border color handling requirements may be achieved by increasing adding border color pointers to the border color register 424 rather than by implementing larger border color caches.

Figure 4:
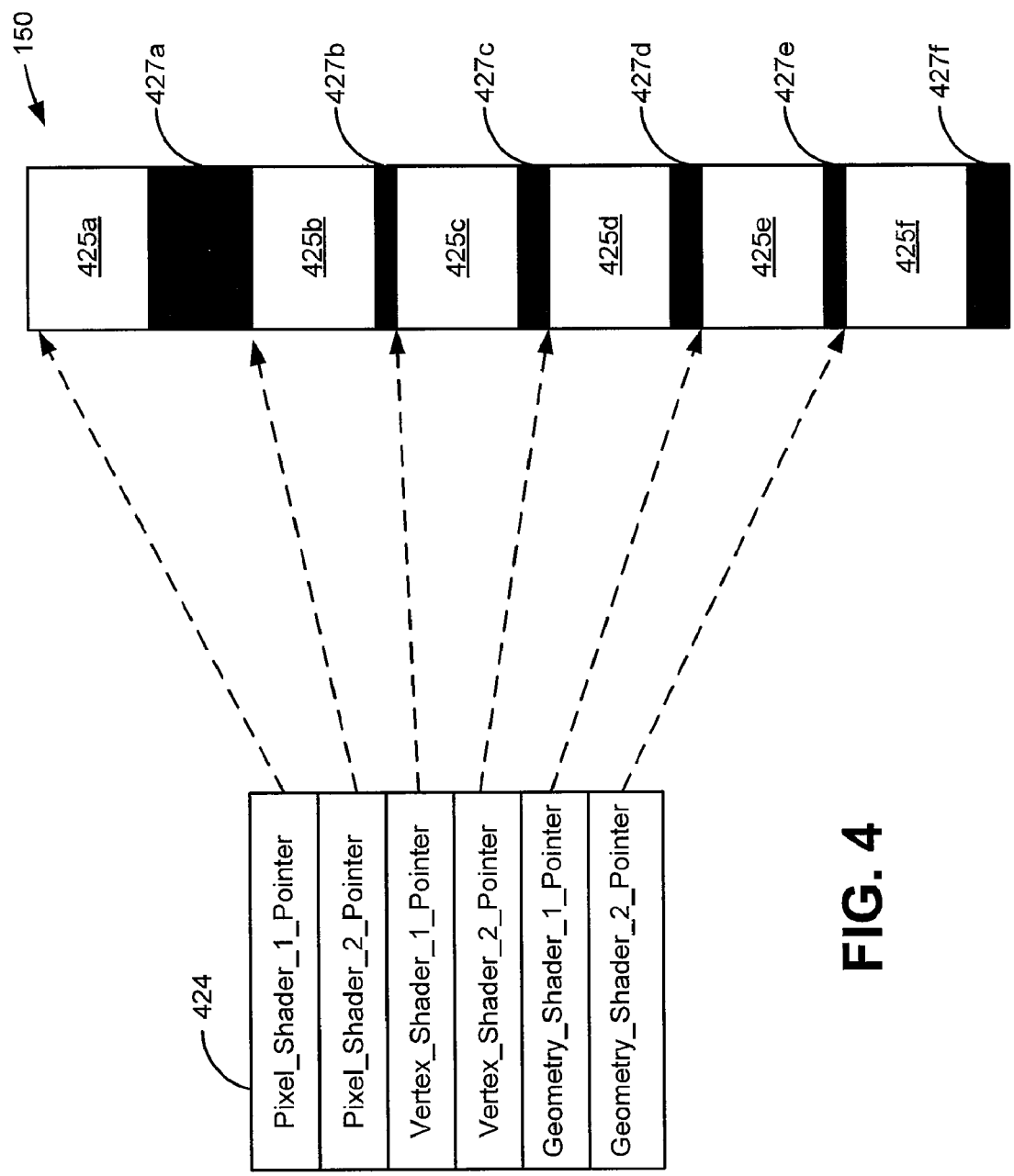
FIG. 4 depicts an exploded view of certain components of a graphics processing unit in accordance with an embodiment of the disclosure.

Reference is now made to FIG. 4, which depicts an exploded view of border color register 424 and external memory 150. If should be appreciated that free memory space 427 may not necessarily depict all free space available in an external memory; however, free memory space 427 is so illustrated for sake of clarity and ease of depiction. The depicted border color register 424 stores six border color pointers for three parallel executable shaders and two memory contexts per shader: Pixel_Shader_1_Pointer, Pixel_Shader_2_Pointer, Vertex_Shader_1_Pointer, Vertex_Shader_1 2_Pointer, Geometry_Shader_1_Pointer, and Geometry_Shader_1 2_Pointer. It should be appreciated that more or fewer border color pointers may be employed depending on the number of border color contexts required to support a graphics processing unit.

For example, low cost graphics processing units utilizing current technology may be configured to support fewer parallel executable shaders; therefore, fewer border color pointers may be required. Alternatively, graphics processing units may be configured to support more parallel executable shaders, requiring more border color pointers. It should be appreciated that while the depicted border color register 424 supports six contexts of border color data in the external memory 150, a graphics processing unit may not require the storage of six contexts at a given time, as texture operations for various parallel executable shaders may not be in a border color mode. For example, only one shader may require border color texture operations; therefore, only one context of border color information is required to be populated in the external memory 150.

Contiguous memory blocks 425 can be populated by a software driver with border color information if texture operations are in a border color mode. Each contiguous memory block 425 may include sixteen border colors corresponding to an executable shader. Further, each border color may be stored in twelve various data formats for retrieval and use by a TCC and texture filter unit. Each border color may be populated in external memory in formats including but not limited to: UINT32, SINT32, UNORM8, UNORM10, UNORM16, UNORM24, SNORM8, SNORM10, SNORM16, SNORM24, FP16 and FP32. Each border color can also be stored in each of the twelve formats contiguously.

Additionally, each border color format can be stored at 128 bit intervals to improve accessibility; however, it should be appreciated that this interval may vary for an external memory implemented with varying addressing schemes and/or memory block sizes. Each contiguous memory block 425 can be stored in various places in the external memory 150, with resulting free memory space 427 existing in between various contiguous memory blocks 425. It should be appreciated that free memory space 427 need not necessarily be unoccupied or empty, as a graphics processing unit may utilize free memory space 427 for other purposes. It should also be appreciated that the above described arrangement scheme for each contiguous memory block 425 can be varied in accordance with the present invention.

Each of the above noted border color pointer specifies a base address 425 at which respective blocks of border colors are contiguously stored in external memory 150. A TCC may retrieve a given border color for texture processing operations by a texture filter unit by reading a border color pointer corresponding to a shader requiring border color texture processing operations. As noted above, a border color pointer specifies a base address in external memory 150. Depending on the specific border color requested by a texture address generator or texture filter unit the TCC may retrieve the proper border color because border color data can be populated in external memory 150 in a predetermined order accordingly to a previously specified storage and arrangement scheme.

Figure 5:
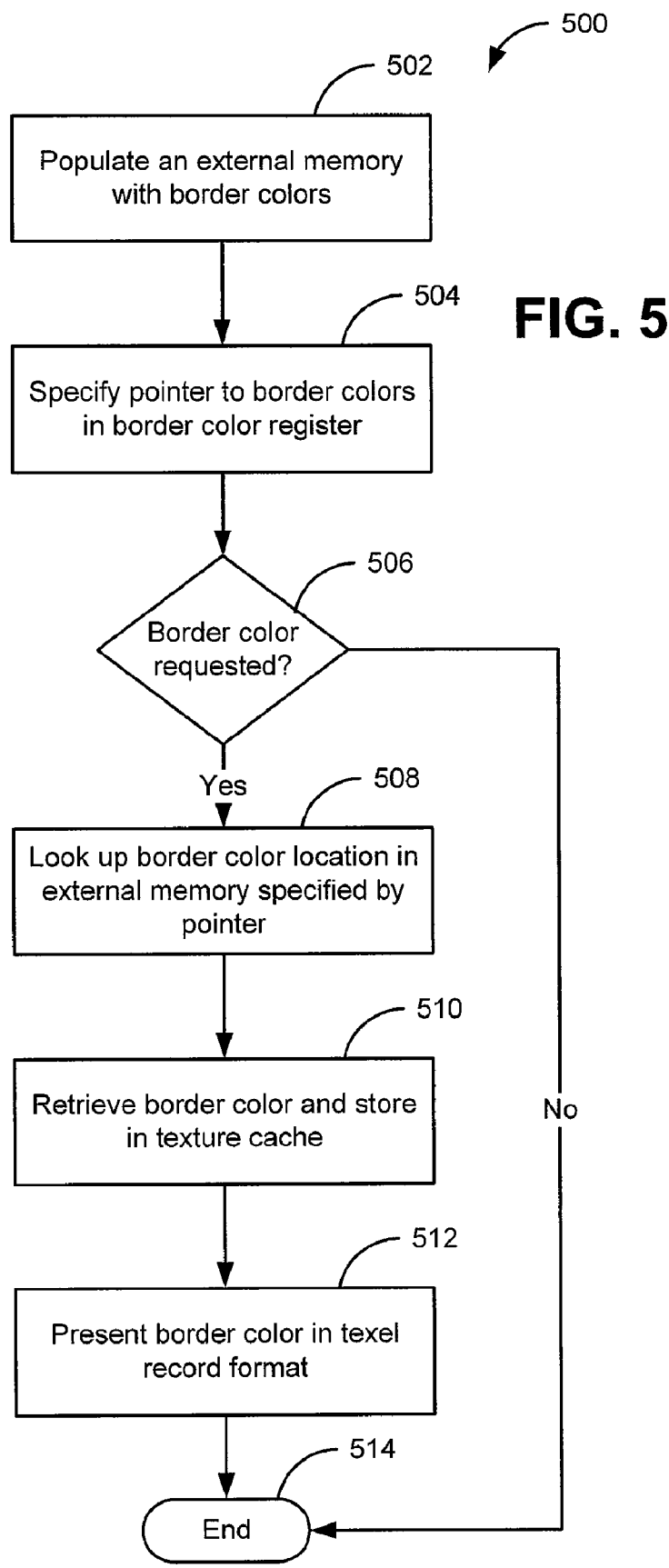
FIG. 5 depicts a flow diagram of a method in accordance with an embodiment of the disclosure.

Reference is now made to FIG. 5, which depicts a flowchart diagram of a method embodiment 500 of the present invention. In step 502, external memory is populated with border color data. As noted above, border color data corresponding to a shader executable in a graphics processing unit may be stored in contiguous blocks of memory to allow for efficient retrieval. It should be appreciated that border color information may be populated in external memory when texture operations require border color mode. It should also be appreciated that border color information may be populated in an external memory by a software driver working in conjunction with a software graphics API such as the Direct3D® API.

In step 504, a border color register is populated with a border color pointer specifying a base address in memory corresponding to the location of border color information in memory. As noted above in reference to previous embodiments, such a border color pointer allows for retrieval from external memory of border color information for texture operations. In step 506, a request for a border color is received. In step 508, the base address of border color information specified by a border color pointer stored in a border color register is determined. In step 510, the requested border color is retrieved in a proper data format by utilizing the base address specified by the border color pointer. The retrieved border color may also be stored in a cache such as a texture cache by a texture cache controller retrieving the border color. In step 512, the border may be presented to a texture filter unit in a texel record format.

The flow-chart of FIG. 5 depicts an exemplary embodiment of a method according to the disclosure. It should be noted that the method depicted in FIG. 5 as well as other embodiments of the present disclosure can be implemented in hardware, software, firmware, or a combination thereof. In one embodiment(s), the method is implemented in software or firmware that is stored in a memory and that is executed by a suitable instruction execution system. If implemented in hardware, as in an alternative embodiment, the method can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), integration with a graphics processing unit component, etc.

Any process descriptions or blocks in flow charts should be understood as representing hardware logic, embedded logic, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

For example, it will be appreciated by persons skilled in the art, based on the description provided herein that embodiments a graphics processing unit, comprising a border color register, a texture cache, a texture cache controller, and a texture filter unit. In certain embodiments, the border color register stores at least one border color pointer, the at least one border color pointer indicating an address in an external memory at which border color information is located, and the border color information is populated within the external memory and retrieved by the texture cache controller if the texture filter unit requires a border color for texture mapping operations.

In embodiments of the invention, the border color register stores at least one border color pointer for each shader instance executable by the graphics processing unit, and the external memory is configured to store at least sixteen border colors for each shader instance executable by the graphics processing unit. These at least sixteen border colors may be stored in any of a plurality of formats, and further may be aligned in the external memory at 128 bit intervals.

In other embodiments, the texture cache controller is configured to fetch a border color on behalf of the texture filter unit from the external memory from a location in the external memory derived from a base address specified by a pointer stored within the border color register. In some embodiments, the texture cache controller is configured to fetch a border color in one of the plurality of formats for border color operations on behalf of the texture filter unit. In other embodiments, the texture cache controller is configured to store border color information fetched from the external memory in the texture cache. In some embodiments, the texture cache controller is configured to present border color information in a texel record format to the texture filter unit for border color operations. In other embodiments, the texture cache controller is configured to fetch a border color from the external memory when the texture address generator generates an address that is out of range relative to a texture processed by the texture filter unit.

In accordance with other embodiments of the invention, a method processes border color information comprising populating an external memory with a plurality of border colors, populating a border color register with the location in external memory of the plurality of border colors, retrieving a single record of the plurality of border color records from the external memory, storing the single record in a texture cache in a texel record format, and providing the texel record formatted single record to a texture filter for texture mapping operations requiring border color information.

In certain embodiments, a software driver performs the step of populating the external memory with the plurality of border colors. This populating the external memory may further comprise converting each border color of the plurality of border colors into a plurality of data formats and storing the plurality of border colors in the external memory in a plurality of data formats. The converting may operate to convert each of the plurality of border colors into at least twelve data formats. The converting may also operate to store each of the plurality of border colors in the external memory at 128 bit intervals in the external memory.

In some embodiments, the populating the external memory may further comprise populating the external memory with at least sixteen border colors for each shader executable by a graphics processing unit. Some embodiments further comprise storing at least one border color pointer within the border color register, the at least one border color pointer specifying a location in the external memory at which the plurality of border colors are stored. Some embodiments further comprise storing at least one border color pointer for each shader executable in parallel by a graphics processing unit.

In yet other embodiments, a graphics processing unit comprises a border color register, a texture cache, a texture cache controller, and a texture filter unit, wherein the border color register stores at least one border color pointer, the at least one border color pointer indicating an address in an external memory at which at least sixteen border colors are located, and wherein the texture cache controller is configured to present the at least sixteen border colors in a texel record format to the texture filter unit for border color operations, the texture cache controller is configured to store border colors fetched from the external memory in the texture cache, the texture cache controller is configured to fetch a border color on behalf of the texture filter unit from the external memory from a location in the external memory derived from a base address specified by a pointer stored within the border color register, the at least sixteen border colors are populated within the external memory and retrieved by the texture cache controller if the texture filter unit requires a border color for texture mapping operations and the at least sixteen border colors are stored in a plurality formats aligned in the external memory at 128 bit intervals.

Having thus described the invention, at least the following is claimed:

1. A graphics processing unit, comprising:
   a border color register;
   a texture cache;
   a texture cache controller; and
   a texture filter unit;
   wherein, the border color register stores a border color pointer, the border color pointer indicating an address in an external memory at which border color information is located; and
   wherein the border color information is populated within the external memory and retrieved by the texture cache controller if the texture filter unit requires a border color for texture mapping operations, and wherein the border color register stores at least one border color pointer for each shader instance executable by the graphics processing unit.

2. The graphics processing unit of claim 1, wherein the external memory is configured to store a plurality of border colors for each shader instance executable by the graphics processing unit.

3. The graphics processing unit of claim 2, wherein the external memory is configured to store each of the border colors in a plurality of formats.

4. The graphics processing unit of claim 3, wherein the at least sixteen border colors stored in the plurality formats are aligned in the external memory at specified intervals.

5. The graphics processing unit of claim 1, wherein the texture cache controller is configured to fetch a border color on behalf of the texture filter unit from the external memory from a location in the external memory derived from a base address specified by a pointer stored within the border color register.

6. The graphics processing unit of claim 1, wherein the texture cache controller is configured to fetch a border color in one of the plurality of formats for border color operations on behalf of the texture filter unit.

7. The graphics processing unit of claim 1, wherein the texture cache controller is configured to store border color information fetched from the external memory in the texture cache.

8. The graphics processing unit of claim 1, wherein the texture cache controller is configured to present border color information in a texel record format to the texture filter unit for border color operations.

9. The graphics processing unit of claim 1, wherein the texture cache controller is configured to fetch a border color from the external memory when the texture address generator generates an address that is out of range relative to a texture processed by the texture filter unit.

10. The graphics processing unit of claim 1, wherein the border color register stores a plurality of border color pointers for retreiving border color information for a plurality of shaders in parallel.

11. A method of processing border color information, comprising:
    populating an external memory with a plurality of border colors;
    populating a border color register with the location in the external memory of the plurality of border colors;
    retrieving a single record of the plurality of border color records from the external memory;
    storing the single record in a texture cache in a texel record format;
    providing the texel record formatted single record to a texture filter unit for texture mapping operations requiring border color information; and
    storing border color pointer for each shader executable in parallel by a graphics processing unit.

12. The method of claim 11, wherein the step of populating the external memory further comprises:
    converting each border color of the plurality of border colors into a plurality of data formats and storing the plurality of border colors in the external memory in a plurality of data formats.

13. The method of claim 11, wherein the step of populating the external memory further comprises:
    populating the external memory with a plurality of border colors for each shader executable by a graphics processing unit.

14. The method of claim 11, further comprising:
    generating an address that is out of range relative to a texture processed by the texture filter unit.

15. The method of claim 12, wherein the step of convertin each of the plurality of border colors further comprises:
    storing each of the plurality of border colors in the external memory at specified intervals in the external memory.

16. The method of claim 11, further comprising:
    storing a border color pointer within the border color register, the border color pointer specifying a location in the external memory at which the plurality of border colors are stored.

17. The method claim 11, wherein each of the data formats are stored in a contiguous block of the external memory at specified intervals.

* * * * *